United States Patent [19]

Katsumata et al.

[11] Patent Number: 5,677,009
[45] Date of Patent: Oct. 14, 1997

[54] METHOD OF PRODUCING METAL PLATED COATING MATERIAL

[75] Inventors: Makoto Katsumata; Hidenori Yamanashi; Hitoshi Ushijima, all of Gotenba, Japan

[73] Assignee: Yazaki Corporation, Tokyo, Japan

[21] Appl. No.: 452,948

[22] Filed: May 30, 1995

Related U.S. Application Data

[62] Division of Ser. No. 297,041, Aug. 29, 1994, Pat. No. 5,556,702.

[30] Foreign Application Priority Data

Aug. 31, 1993 [JP] Japan .................... 5-216037

[51] Int. Cl.$^6$ ............................. B05D 1/18
[52] U.S. Cl. ............................. 427/443.1
[58] Field of Search .................. 427/531, 443.1

[56] References Cited

U.S. PATENT DOCUMENTS

| | | | |
|---|---|---|---|
| 4,271,045 | 6/1981 | Steigerwald et al. | 252/511 |
| 4,604,276 | 8/1986 | Oblas et al. | 423/449 |
| 5,169,508 | 12/1992 | Suzuki et al. | 204/290 R |
| 5,254,409 | 10/1993 | Yagi et al. | 428/392 |
| 5,300,553 | 4/1994 | Yamanashi et al. | 524/496 |
| 5,399,330 | 3/1995 | Katsumato et al. | 423/447.4 |

FOREIGN PATENT DOCUMENTS

| | | | |
|---|---|---|---|
| 62-15637 | 1/1987 | Japan | G06F 9/44 |
| 2-189811 | 7/1990 | Japan . | |
| 2189811 | 7/1990 | Japan | H01B 5/02 |

*Primary Examiner*—Benjamin Utech
*Attorney, Agent, or Firm*—Armstrong, Westerman, Hattori, McLeland & Naughton

[57] ABSTRACT

A metal plated carbon material containing at least one metal chloride compound disposed between graphite layers to form a graphite intercalation compound, and a metal plated layer being formed on a front surface of the metal plated carbon material. A method of producing the metal plated carbon material comprising the steps of immersing a graphite intercalation compound in an electroless plating solution for 6 to 30 hours, and forming a metal plated layer on a surface of the graphite intercalation compound with an excellent adherence thereto.

2 Claims, No Drawings

METHOD OF PRODUCING METAL PLATED COATING MATERIAL

This is a Divisional application of Ser. No. 08/297,041, filed Aug. 29, 1994, now U.S. Pat. No. 5,556,702.

BACKGROUND OF THE INVENTION

1. Field of the Invention

The present invention relates to a carbon material having a metal plated layer suitable for an electro-conductive element and a heat-conductive element and to a fabrication method thereof.

2. Description of the Prior Art

In recent years, in many industrial fields such as in home electric industries, automobile industries and aerospace industries, it has been requested to provide miniaturized, highly integrated and personalized products. Thus, electromagnetic shielding materials, light-weight electro-conductive materials, large heat-conductive materials and the like that fulfill the requirements have been developed.

Various metal materials have been used for such materials in question. However, these materials tend to be heavy.

On the other hand, since carbon materials have excellent dynamic characteristics, such as having light weight, large tensile strength, and large modulus of elasticity, as well as high electro-conductivity and large heat-conductivity, these materials have been used for structural members especially in the fields of sports industries, leisure industries, and aerospace industries. However, there have been very few applications of carbon materials based on the characteristics of their electro-conductivity and heat-conductivity, and only carbon type electro-conductive paints and bonding agents could have been found in low power electric circuits.

This is because the electro-conductivity of the carbon materials is much lower than that of metal conductors. For example, as a means for improving electro-conductivity of carbon fibers, a technology for metal-plating the surface of carbon fibers has been proposed as seen in Japanese Patent Laid-Open Publication No. 2-189811. However, in a treatment of electrolytic-plating, since the electro-conductivity of the carbon fibers is not high, a speed of film forming is slow and, moreover, a uniform film could not be formed. On the other hand, in a treatment of electroless plating, since the activation process is complicated and also a speed of film forming is slow, accordingly, the productivity has been poor.

Another type technology such as for milling or chopping continued carbon fibers of polyacrylonitrile (PAN) type or pitch type has been proposed for providing carbon fibers shortened in length. Yet further, another technology has been proposed wherein vapor-phase grown carbon fibers (VGCF) obtained through thermal decomposition of a raw organic compound by the act of catalysis of ultra fine particles of fibrous metal or metal-organic compounds, and compounding discrete carbon fibers of thus obtained VGCF with a plastic material so as to use the resultant material as a carbon fiber reinforced plastic or an electro-conductive plastic.

However, the electro-conductivity of such composite materials has an electric resistivity of $10^{-2}\Omega$ cm at the most or as a limit. A metal plating treatment for such discrete carbon fibers is disclosed in, for example, Japanese Patent Publication No. 62-15637, wherein a method of pretreatment is described for forming a thin film of a noble metal on the discrete carbon fibers for electroplating. However, this method has a problem such that a uniform layer can hardly be formed on fine fibers.

SUMMARY OF THE INVENTION

It is therefore an object of the present invention to eliminate the problems encountered in the prior art method and to provide a carbon material with a metal plated surface layer having characteristics of excellent uniformity and excellent adherence and a method of producing the same.

An aspect of the present invention is to provide a metal plated carbon material containing at least one metal chloride disposed between graphite layers, and being formed a metal plated layer on a surface thereof.

Another aspect of the present invention is to provide a method of producing a metal plated carbon material, wherein immersing a graphite intercalation compound, which is synthesized by a carbon material and at least one metal chloride, in an electroless plating solution, and then forming a metal plated layer on a surface of the graphite intercalation compound.

The metal plating carbon material according to the present invention has a uniformly metal-plated layer, thus provided are high adherence of the metal plated layer and high electro-conductivity.

In addition, according to the method of the present invention, a metal can be uniformly plated on a carbon material, in particular, on a powder carbon material. The metal plating on fine carbon fibers has been difficult by conventional technologies, however, in accordance with this invention, such difficulty can be eliminated and a metal layer can be plated even on fine carbon fibers. The adherence of the metal plated layer onto the carbon material and the electro-conductivity of the resultant material are very high.

These and other objects, features and advantages of the present invention will become more apparent in light of the following detailed description of embodiments of the present invention, as illustrated in the accompanying drawings.

DESCRIPTION OF PREFERRED EMBODIMENTS

A carbon material used in the present invention is natural graphite powder, artificial graphite powder, kish graphite powder, carbon fibers, graphite fibers, or the like.

The natural graphite, artificial graphite and kish graphite are preferable to powder by milling to an order of 100 mesh or less. Since the graphite has a two-dimensional structure, it is difficult to form a uniform metal plated layer when large crystal is employed.

The carbon fibers or graphite fibers used in one embodiment of the present invention are continuous carbon fibers or continuous graphite fibers provided by spinning a melted macro-molecule precursor, performing non-melting heat treatment in an oxidizing atmosphere, performing carbonizing heat treatment in an inert gas atmosphere at a temperature of 1000° C. or more, and then performing high temperature heat treatment in an inert gas atmosphere at a temperature of 1500° C. or more, preferably 2500° to 3500° C. The carbon fibers or graphite fibers used in another embodiment of the present invention are discontinuous carbon fibers or discontinuous graphite fibers provided by chopping or milling the continuous carbon fibers or continuous graphite fibers into any desired length.

The macro-molecule precursor used in still another embodiment of the present invention is a synthetic resin, for example, polyacrylonitrile, rayon, polyvinyl alcohol, vinyl chloride, phenol, aramid, polyamide or polyimide, or a natural macro-molecular compound such as of a pitch of oil or coal.

Further, vapor-phase grown carbon fibers (VGCF) are also used in the present invention. The vapor phase grown carbon fibers (VGCF) are carbon fibers having a length of 1000 μm or less and a diameter of 1 μm or less. These vapor-phase grown carbon fibers are produced by gasifying a carbon supplying substance and contacting it with a catalyst of ultra fine metal particles or a metal organic compound, or a catalyst of ultra fine metal particles of a transition metal, such as iron, nickel or cobalt, whereas when the catalyst is of metal particles, a diameter of particles should be 300 μm or less, when the catalyst is of a metal organic compound, it should be the one usable as a state of liquid or solution, or especially the one vaporizable such as metallocene. The contact of the gasified carbon supply substance with said catalyst is implemented in a reacting region ranging from 900° to 1500° C. along with a carrier gas such as of hydrogen, carbon monoxide, carbon dioxide or the like. The carbon supplying substances are, for example, an aliphatic hydrocarbon group such as methane, ethane, propane, propylene and the like, an aromatic hydrocarbon group such as benzene, toluene and the like, an alicyclic hydrocarbon group such as cyclohexane, cyclooctane and the like, an alcohol group such as ethanol, butanol, octanol and the like, a ketone group such as ethyl isobutylketone, cyclohexane and the like, in nitrified organic compound such as hexylamin and the like, a sulfurated organic compound such as octylmercaptane and the like, and a chlorinated compound such as carbon tetrachloride and the like.

The vapor-phase grown carbon fibers (VGCF) obtained in such a process as described above are treated by heat in an inert gas atmosphere such as argon at a temperature of 1500° to 3500° C., preferably 2500° to 3500° C., for 3 to 120 minutes, preferably 30 to 120 minutes. As a result, graphite fibers having highly developed graphite structure are obtained.

In accordance with this invention, the above-mentioned carbon material and at least one of metal chlorides are synthesized to form a graphite intercalation compound.

The metal chlorides to be used in the present invention are, for example, magnesium chloride, stannous chloride, palladium chloride, iron chloride, aluminum chloride and nickel chloride.

The metal chloride graphite intercalation compound is provided by any synthesizing method such as mixing method, two-bulb method, solvent method, melt salt method, electro-chemical method or the like. Next, an example of the synthesizing method of the graphite intercalation compound corresponding to the mixing method above will be described.

The carbon material and the metal chloride compound are uniformly mixed and placed in a reacting vessel. The inner pressure of the reacting vessel is reduced in pressure to an order of $10^{-6}$ Torr. Then, the reacting vessel is closed airtightly. At this point, a reaction accelerator such as chlorine gas having a pressure of several Torr may be charged in the reacting vessel. The closed vessel is heated up to a proper temperature of 300° to 700° C. The reaction is continued for several minutes to several days, preferably one hour to three days, after setting the appropriate temperature. As a result, a metal chloride graphite intercalation compound containing the metal chloride between graphite layers is obtained.

The metal plating treatment is performed by immersing the above-mentioned metal chloride graphite intercalation compound into an electroless plating solution containing film forming metal ions. A time required for finishing the metal plating treatment depends on the thickness of the film to be formed, however, a proper plating can be obtained in 2 to 40 hours, preferably 6 to 30 hours. Even if the metal plating is carried out for more than 40 hours, the thickness of the metal layer will not increase. If the time of metal plating is less than 2 hours, it is impossible to obtain a uniform metal plated layer.

It is possible to add some additives such as a brightener, an antioxidant, and the like to the electroless plating solution besides the film forming metal ions.

Examples of the present invention and comparisons will be described hereinafter.

EXAMPLE 1

PNA type carbon fibers (TOREKA MLD300, made by TORAY K. K.) on the market were heated in an argon gas atmosphere at 3000° C. so as to produce graphitized fibers. The resultant graphite fibers of 5 grams were mixed with palladium chloride anhydride of 5 grams. The mixture was then placed in a reacting vessel and heated up to 120° C. The reacting vessel was reduced pressure to $10^{-6}$ Torr or less and maintained for 20 hours or more. Thereafter, chlorine gas was charged into the reacting vessel until the pressure reaches to 0.1 Torr and then the reacting vessel was closed airtightly. The reaction was continued for 3 days at 420° C. As a result, obtained was a palladium chloride graphite intercalation compound containing palladium chloride disposed between graphite layers.

In the next step, the palladium chloride graphite intercalation compound was immersed in an electroless plating solution and stirred at a room temperature for 20 hours so as to perform copper plating treatment. As a result, a metal plated carbon material A was obtained.

EXAMPLE 2

Pitch type carbon fibers (GURANOC XN40, made by Nippon Oil K. K.) on the market were treated in the same way as in the Example 1 to synthesize a palladium chloride intercalation compound. Thereafter, the palladium chloride intercalation compound was immersed in an electroless plating solution and stirred at a room temperature for 20 hours so as to perform copper plating treatment. As a result, a metal plated carbon material B was obtained.

EXAMPLE 3

Benzene was utilized as a carbon supplying substance for providing carbon fibers. Ferrocene was employed as a catalyst. Hydrogen was used for a carrier gas. Vapor phase grown carbon fibers (VGCF) having a length of 50 μm or less and a diameter of 0.01 to 0.5 μm were heated in an argon gas atmosphere at 3000° C. As a result, graphite vapor phase grown carbon fibers were obtained. Thus obtained graphitized vapor phase grown carbon fibers were treated in the same process as in the Example 1 so as to synthesize a palladium chloride intercalation compound. The palladium chloride intercalation compound was immersed in an electroless plating solution and stirred at a room temperature for 20 hours so as to perform copper plating treatment. As a result, a metal plated carbon material C was obtained.

COMPARISON 1

The PAN type carbon fibers (TOREKA MLD300, made by Toray K. K.), which were the same as those used in the Example 1, were directly immersed in a copper sulfate plating solution and stirred at a room temperature for 20 hours so as to perform copper plating treatment. As a result, a metal plated copper material X was obtained.

COMPARISON 2

By using the pitch type carbon fibers (GURANOKKU XN40, made by Nippon Oil K. K.), which were the same as those used in the Example 2, and in the same steps as in the Comparison 1, the copper plating treatment was performed. As a result, a metal plated carbon material Y was obtained.

COMPARISON 3

In the same way as in the Example 3, benzene was used for a carbon supplying substance for carbon fibers. Ferrocene was employed as a catalyst. Hydrogen was used for a carrier gas. Vapor-phase grown carbon fibers (VGCF) having a length of 50 μm or less and a diameter of 0.01 to 0.5 μm grown at 1100° C. were treated by heat in an argon gas atmosphere at 3000° C. Thus obtained graphitized vapor-phase grown carbon fibers were treated in the same copper plating treatment as in the Comparison 1. As a result, a metal plated carbon material Z was obtained.

In the above Examples, the obtained metal plated carbon materials A, B, and C had metal plated layer adhered tightly to respective carbon material. Among these, the adherence of the metal plated carbon material C was excellent.

On the other hand, in the above comparisons, the adherence of the metal plated layers of the metal plated carbon materials X, Y, and Z was poor and they could hardly be afforded for practical use.

Although the present invention has been described with respect to the preferred embodiments thereof, it should be understood by those of ordinary skilled in the art that various modifications can be made without departing from the scope of this invention. Accordingly, this invention is not to be limited except as by the appended claims.

What is claimed is:

1. A method of producing a metal plated carbon material, comprising the steps of:

immersing a graphite intercalation compound, which is formed by synthesizing a carbon material and at least one metal chloride, in an electroless plating solution containing film forming metal ions; and forming a metal plated layer on a surface of said graphite intercalation compound.

2. A method of producing a metal plated carbon material as claimed in claim 1, wherein the graphite intercalation compound is immersed in the electroless plating solution for 6 to 30 hours.

* * * * *